United States Patent [19]
Wulfsberg et al.

[11] 3,859,475
[45] Jan. 7, 1975

[54] DECODER CHANNEL SELECTOR AND ENUNCIATOR SYSTEM IN AN AIRBORNE RADIOTELEPHONE SYSTEM

[75] Inventors: Paul G. Wulfsberg, Overland Park; Dennis L. Frederickson, Leawood; John R. Alden, Alothe, all of Kans.

[73] Assignee: Wulfsberg Electronics, Inc., Overland Park, Kans.

[22] Filed: Oct. 19, 1972

[21] Appl. No.: 299,075

[52] U.S. Cl. .................... 179/41 A, 325/55, 325/64, 340/168 R
[51] Int. Cl. ............................................ H04m 5/08
[58] Field of Search .............. 179/41 A; 325/55, 64; 340/164 R; 343/179

[56] References Cited

UNITED STATES PATENTS

| | | | |
|---|---|---|---|
| 3,268,664 | 8/1966 | Fleissner et al. | 325/55 |
| 3,351,714 | 11/1964 | Kunzelman et al. | 179/41 A |
| 3,387,270 | 6/1968 | Adlhoch et al. | 340/164 R |
| 3,458,664 | 7/1969 | Adlhoch et al. | 179/41 A |
| 3,535,636 | 10/1970 | Muilwjk | 325/55 |
| 3,590,166 | 6/1971 | Anschutz et al. | 179/41 A |

*Primary Examiner*—Kathleen H. Claffy
*Assistant Examiner*—Gerald L. Brigance
*Attorney, Agent, or Firm*—Warren H. Kintzinger

[57] ABSTRACT

An airborne radiotelephone system with push-to-talk operation that does not require the transmitter to be on continuously during a call. The system is all solid state with an electronic decoder with no moving parts such as relays. It is a system capable of much higher speeds than the presently used ten pulses per second code, and that may be used with other than standard 600 and 1,500 cycle tones. Manually initiated high speed selector utilizes locally generated pulses to operate digital channel decoder, display circuitry, and channel oscillator selection circuitry.

8 Claims, 6 Drawing Figures

Figures 1, 2, 3:
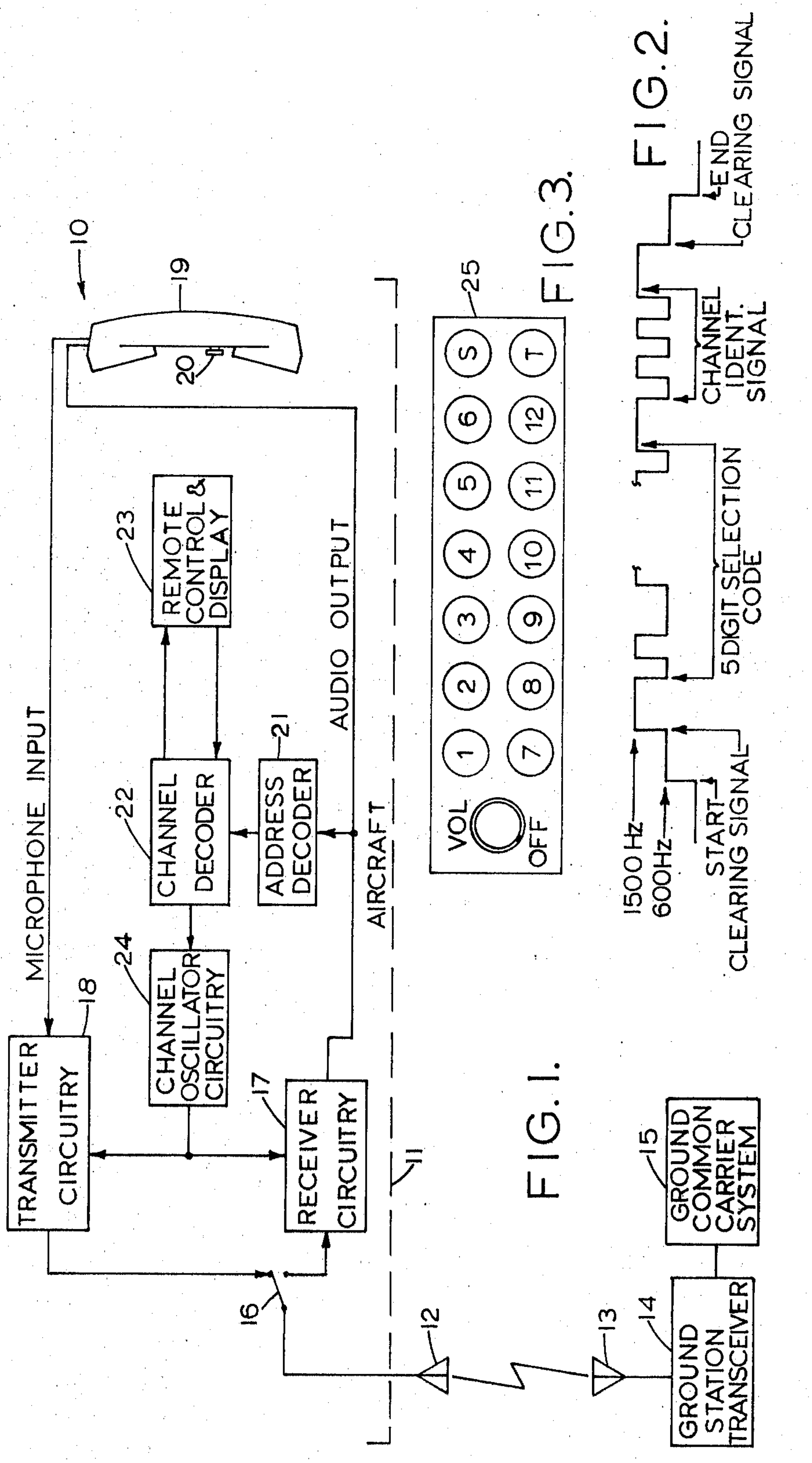

DECODER CHANNEL SELECTOR AND ENUNCIATOR SYSTEM IN AN AIRBORNE RADIOTELEPHONE SYSTEM

This invention relates in general to radiotelephones and in particular, to airborne radiotelephones used in public airground service as defined in Part 21, FCC Rules and Regulations.

The airborne radiotelephones are used in two-way public communication between aircraft and ground stations, ultimately to number ninety for the fifty states, including some Canadian stations already in operation and others along with Carribean stations being planned. These ground stations are inter-connected with telephone company telecommunication networks and the worldwide telephone system. Interconnection to the telephone network is made through an operator at a control terminal via a ground radio station provided with either wireline or non-wireline common carrier interconnect to the system. Thus, two-way public telephone service is provided between aircraft in the air and parties on the ground with 450 MHz base stations connected to control terminals and mobile service switchboards. With tone signals being transmitted from each ground station at a reduced level when the channel is idle a call is initiated from an aircraft by the user selecting the channel with the clearest tone. The push-to-talk button is depressed and the ground station operator comes on at a normal RF level. With calls from the ground the local mobile service operator is given the approximate aircraft location and telephone number. This information is passed on to the mobile operator having direct access to a ground station near the aircraft so she can dial the five-digit selector number comprising the desired airborne radiotelephone number. Immediately thereafter the channel identifying digit is transmitted on the signaling channel continuously monitored by all radiotelephone equipped planes flying in the area. This automatically switches the airborne radiotelephone equipment to the calling station frequency and activates alerting signal apparatus.

Each airborne unit responds to its specific five-digit telephone number code and to a channel designation signal in the form of a single train of pulses transmitted from the ground. The channel designation signal identifies only the desired talking channel to the specific single aircraft being called. Upon receiving the channel designation signal an audible ringing signal and/or a channel designation light is turned on. The ringing signal is stopped by removing a handset from its hook switch or by pressing a talk button on a cockpit control panel when using the standard cockpit audio system.

Obviously, for such airborne use high reliability, excellence of performance, quick and easy serviceability, flexibility in usage, and ease of installation are greatly desired. Further, weight and power requirements are important considerations. Speed and accuracy of response are also important attributes attained with a solid state system using no moving parts such as relays. Any reduction in overall circuitry and simplification of design such as by utilization of circuitry twice both in receiving ground initiated calls and airborne radio system initiated calls is important in achieving desired design objectives.

It is, therefore, a principal object of this invention to provide an airborne radiotelephone system with a reduction in overall circuitry through utilization of some circuitry twice both in receiving ground initiated calls and airborne radio system initiated calls.

Another object is to provide such an airborne radiotelephone system that is a solid state system of low weight and minimal power requirements using no moving parts such as relays and cooling motors and fans.

A further object is to provide such an airborne radiotelephone with very high speed signal and accuracy of response capabilities.

Another object is to provide a system with quick and easy maintenance, flexibility in usage and the ease of installation and removal attainable with modular construction.

Features of this invention useful in accomplishing the above objects include, in an airborne radiotelephone system providing phone communication between ground stations and aircraft, airborne receivers tuned to 454.675 MHz, a selective calling and channel code transmit frequency common to all ground stations, to receive a call with the channel selection code automatically shifting the receiving radiotelephone system to the working channel (1 through 12) for a particular ground station. The system is a pulse operated system with each tone transition from 600 to 1,500 or from 1,500 to 600Hz producing one pulse. The pulses are grouped into digits with a 0.1 second spacing maintained between pulses within a digit and at least 0.3 seconds between digits. A five-digit selective calling code calling a specific number is followed by a single train of 2 to 13 pulses (tone transitions) for channel selection to the sending ground station. Wih the pulse code system a number "1" tone transition preceded by and followed by no other tone transitions for at least 0.25 seconds is used as a clearing or reset signal to prepare the decoders for accepting a new selective calling signal from the ground station. Thus, the number "1" always precedes a selective calling signal and always follows the channel identification signal, otherwise the number "1" is just not used in the selective calling code, nor is one single pulse from one tone transition used in the channel selection code. The airborne units working with such a code include an electronic decoder with no moving parts such as relays and cooling fans with driving motors that is actually capable of operating at much higher speeds than the ten pulses per second code. The system also includes high speed channel selection for locally initiated calls from the aircraft utilizing locally generated pulses operating digital channel decoder, display circuitry, and channel oscillator selective circuitry also used in system operation from ground station initiated calls.

A specific embodiment representing what is presently regarded as the best mode of carrying out the invention is illustrated in the accompanying drawings.

In the drawings

Figure 4:
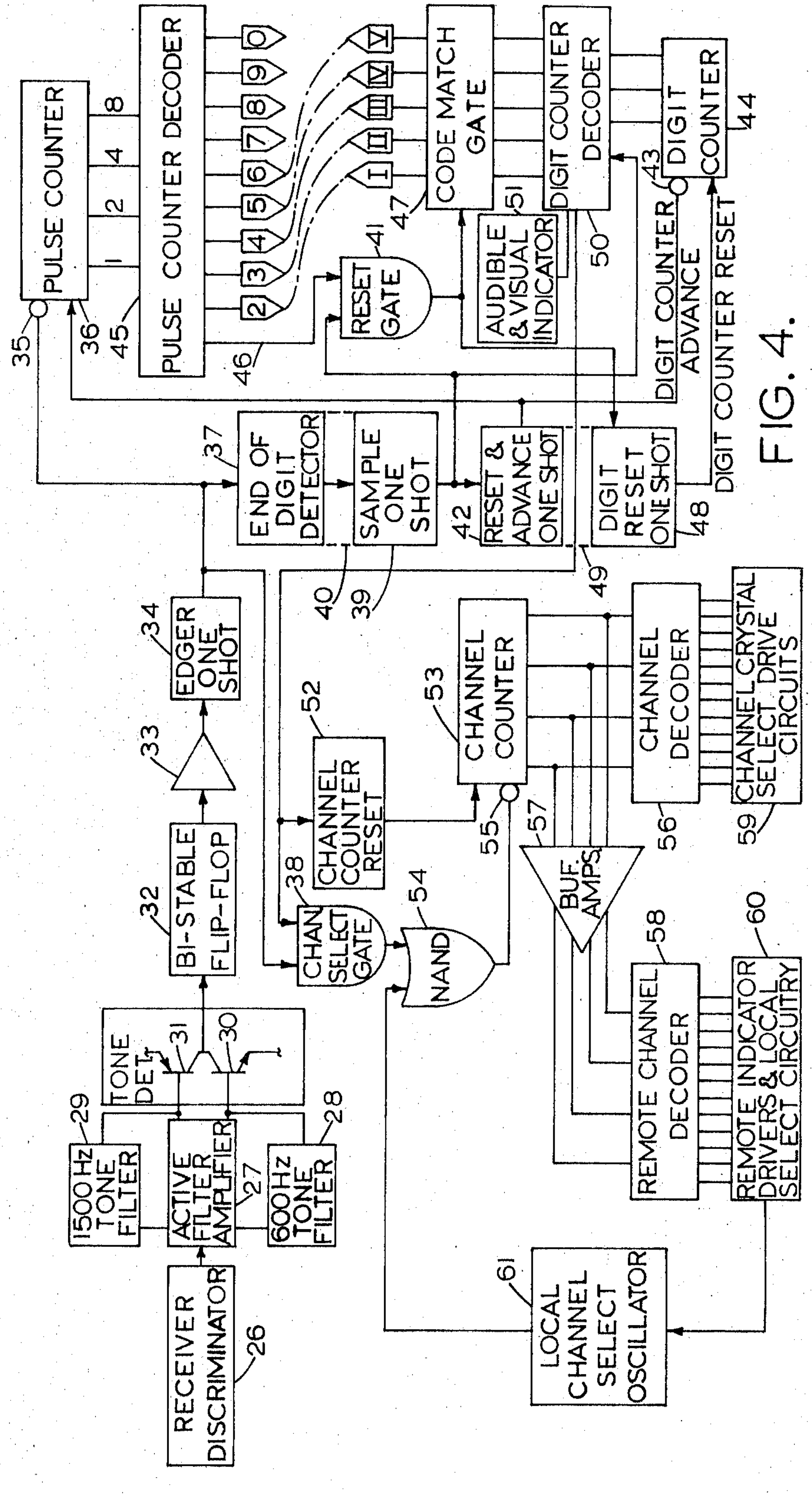
Figures 5, 6:
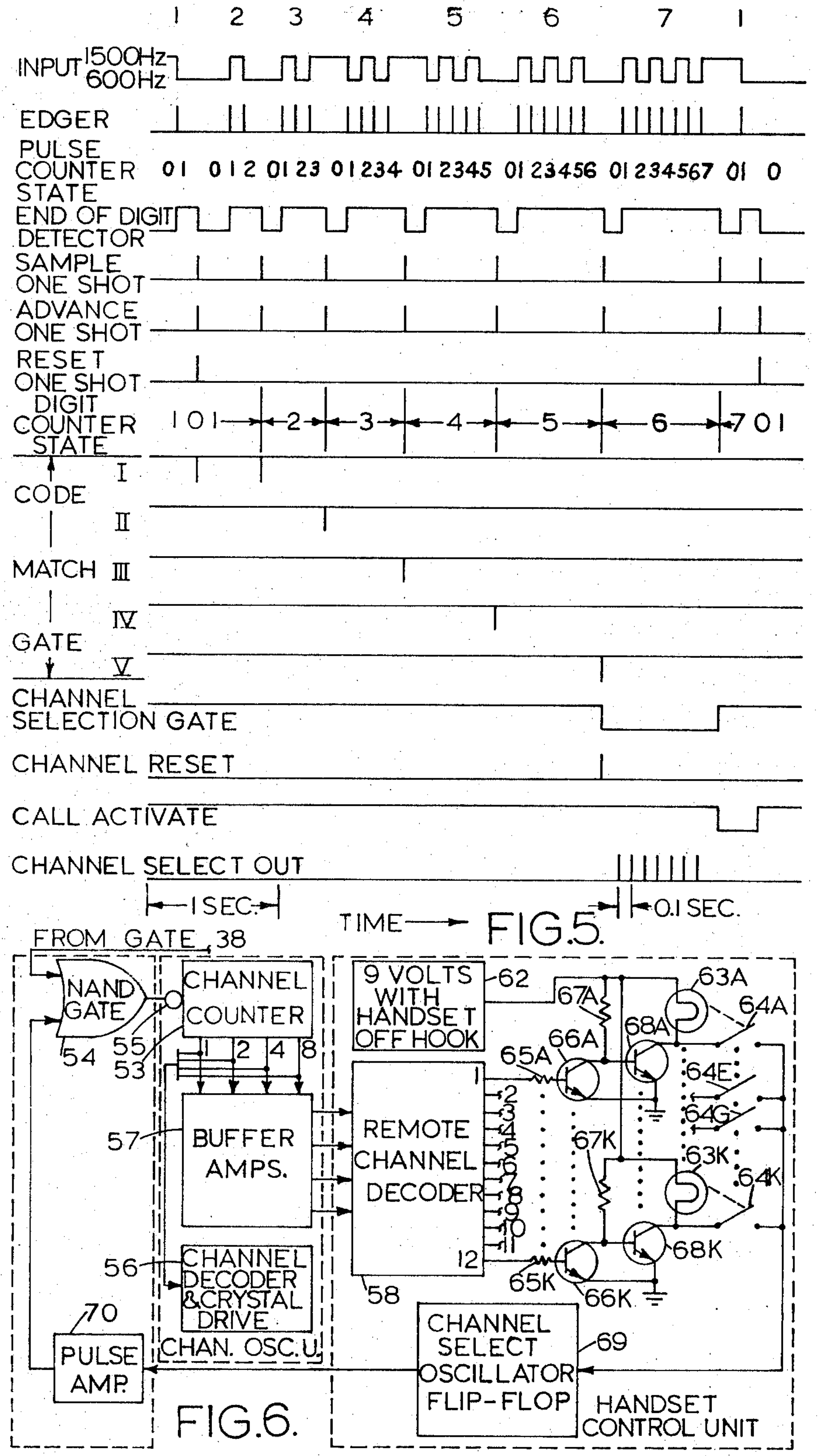

FIG. 1 represents a block schematic view of an airborne radiotelephone in communication with a ground station;

FIG. 2, a standard two-tone signal code for ground station-to-air calling presently used;

FIG. 3, a view of a local cockpit control panel;

FIG. 4, a more detailed block schematic of portions of an airborne radiotelephone system in accord with applicant's novel contributions;

FIG. 5, a family of waveforms explanatory of system sequential operation through various portions of the system in response to a standard ground station initiated calling signal input; and FIG. 6, a combination block schematic functional diagram of local channel selection circuitry much of which is common to ground station initiated call code activated circuits.

REFERRING TO THE DRAWINGS

The airborne radiotelephone system 10 within aircraft 11 is shown to be in two way radio communication via aircraft antenna 12 and ground antenna 13 with ground station transceiver system 14 having an interconnect with a ground common carrier and phone system 15. Aircraft antenna 12 is connected via switch 16 to either receiver circuitry section 17 for the receive mode or to transmitter circuitry section 18 for the transmit mode of operation. The receiver circuitry section 17 has an output connection to a phone handset unit 19, that is equipped with a push-to-talk button 20 and that may be used from a phone cradle or hook (detail not shown). The receiver circuitry section 17 also has an output connection to an address decoder 21 having in turn an output connection to channel decoder circuit section 22. The channel decoder 22 has a channel display output to remote control and display section 23 and a channel select input connection back from the remote control and display section 23. The control output of channel decoder 22 is connected as a control input to channel oscillator circuit section 24 having output selective frequency input connections to both the receiver circuit section 17 and the transmitter section 18. A microphone output of the phone handset 19 is connected as the voice input to transmitter circuitry section 18. When a call is directed to the transceiver radiotelephone system 10 from a ground station 14 the address decoder 21 reacts to its specific five digit address calling code such as the standard code waveform of FIG. 2. With this the channel decoder 22 automatically locks the transceiver on the calling channel, sounds an audible alarm and displays the channel on a remote control indicator. To initiate a call from the radiotelephone system 10 a channel selector button (a selected channel button 1 through 12) such as shown with the local cockpit control panel 25 of FIG. 3. This starts a pulse generator in the remote control unit 23 that continues generating pulses until the channel decoder 22 locks on the selected channel.

All ground stations transmit selective calling code and their respective channel code (or an available channel code of more than one at some ground stations) on one common frequency 454.675MHz that all airborne radiotelephones must be tuned to in order to receive a call when their respective calling code is called. Then the channel selection code automatically shifts the called airborne unit to the working channel (1 through 12) for that particular ground station. This is with the system using the one 454.675 MHz signal (Fs) as a one-way single frequency signaling channel from all ground stations-to-aircraft. Twelve two-way, two frequency receiver/transmitter talking frequencies spaced 5MHz apart, with 25KHz channel spacing in the 450MHz mobile band are also used for aircraft telephone service. The FCC designates the channels geographically to the ground stations by a nationwide frequency plan to minimize cochannel interference in calling high flying aircraft. Co-channel ground stations are never located in close adjacency and generally have intervening ground stations using other talking channels to protect against co-channel interference up to altitudes for called aircraft of at least 40,000 feet. Channel transmitting frequencies, frequency spacing, and separation of base and aircraft frequencies are as follows:

| BASE STATION | AIRCRAFT | CHANNEL |
|---|---|---|
| 454.700MHz | 459.700MHz | 6 |
| 454.725 | 459.725 | 7 |
| 454.750 | 459.750 | 5 |
| 454.775 | 459.775 | 8 |
| 454.800 | 459.800 | 4 |
| 454.825 | 459.825 | 9 |
| 454.850 | 459.850 | 3 |
| 454.875 | 459.875 | 10 |
| 454.900 | 459.900 | 2 |
| 454.925 | 459.925 | 11 |
| 454.950 | 459.950 | 1 |
| 454.975 | 459.975 | 12 |
| 454.675 | — | $F_S$ |

The receiver is capable of operating on any one of the twelve talking channels spaced 25KHz apart and always reverts to the common ground station Fs signaling carrier frequency when the handset is hung up. Thus, it can then again receive signaling on land-originated incoming calls.

Referring again to FIG. 2 the signaling from ground stations employ a standard code derived from time shifts back and forth between 600Hz and 1,500Hz tones modulated on the single frequency 454.675 MHz (Fs) signaling channel common to all ground stations has first a clearing pulse to reset selectors to zero. This clearing pulse is a number "1" (a tone transition preceded by and followed by no other tone transitions for at least 0.25 seconds) used as a clearing or reset signal to prepare the receiving system decoders for accepting a new selective calling signal from the ground station. After an idle period of at least 0.25 seconds the five-digit selection code is sent with tone transitions from 600 to 1,500 or from 1,500 to 600Hz. The pulses are grouped into digits with a 0.1 second spacing maintained between pulses within a digit and at least 0.3 seconds between digits. Next is an idle period of, for example, one second between the five-digit selection code and transmission of the channel designation number that is a single train of 2 to 13 tone transition pulses at 0.1 second successive intervals for channel selection. Then after approximately a 0.30 second pause a number "1" clearing signal pulse is transmitted.

Referring also to the block schematic showing of the airborne radiotelephone decoder channel selector and enunciator system of FIG. 4 a receiver discriminator circuit 26 within the receiver circuitry section 17 has an output connection for passive audio tones to active filter amplifier 27. A 600Hz tone filter 28 and 1,500Hz tone filter 29 are connected for receiving input signaling from active filter amplifier 27 and have output connections to, respectively, one of two outputs from amplifier 27 connected to the bases, respectively, of NPN transistor 30 and PNP transistor 31. The emitters of transistors 30 and 31 are connected to biasing circuitry (not shown) while their collectors are connected in common as an input to bistable flip-flop circuit 32. The output of flip-flop circuit 32 is connected through amplifier 33 to edger one shot circuit 34 having an output connection to the signal invert input terminal 35 of pulse counter 36, to the end of digit detector 37, and to channel select gate 38. The end of digit detector 37 has an output connection to sample one-shot circuit 39 within an integrated circuit unit 40 having an output connection to reset gate 41 and also to reset and advance one shot circuit 42 that has an output connection as a second input to pulse counter 36, and also to the signal invert terminal 43 of digit counter 44. The pulse counter circuit 36 has a four wire 1,2,4 and 8 count BCD output connection to pulse counter decoder 45 having a count "1" output line 46 connection as a second input to reset gate 41. Pulse counter decoder 45 also has 2,3,4,5,6,7,8,9 and 0 (or 10) digit output terminals any particular five of which are hard wired in a predetermined order to the Roman numeral terminals I,II,III,IV and V of code match gate 47 as the telephone call number of that particular airborne radiotelephone. Reset gate 41 has an output connection as an input to both code match gate 47 and digit reset one shot 48 of integrated circuit unit 49. An output connection of digit reset one shot 48 is connected as the second input to digit counter 44 having 1, 2 and 4 count output line connections as inputs to digit counter decoder 50. Decoder 50 also has five input connections from code match gate 47, an output connection to audible and visual indicators circuit 51, and an output connection as the second input to channel select gate 38 and also to channel counter reset circuit 52. The output of channel counter reset circuit 52 is connected as a reset input to channel counter circuit 53.

The output of channel select gate 38 is connected as a signal input connection to NAND gate 54 having an output connection to the signal invert terminal 55 of channel counter 53. The channel counter 53 has a four wire 1, 2, 4 and 8 count BCD output connection to channel decoder 56 and through parallel buffer amplifiers indicated generally by buffer amplifier circuit 57 to remote channel decoder circuit 58. The channel decoder 56 and the remote channel decoder circuit 58 have twelve outputs each only one of which for each is activated at a time with the twelve from the channel decoder 56 connected to individual crystal drive circuits in the channel crystal select drive circuits section 59. The single particular crystal circuit activated at any one time modulates the receiver and transmitter circuit sections for a specific channel talk pair of frequencies 5MHz apart. A corresponding single output activated of the twelve outputs from the remote channel decoder circuit 58 connected to remote indicator drivers and local select circuitry section 60 activates an indicator circuit consistent with the specific channel activated in the channel crystal select drive circuits section 59. The remote indicator drivers and local select circuitry section 60 also has an output connected as an input to local channel select oscillator 61 an output from which is connected as a second input to NAND gate 54.

Referring also to the family of waveforms of FIG. 5 an incoming selective calling signal from a ground station is converted to rectangular pulses by action of active filters 28 and 29 with amplifier circuit 27 and the tone detectors transistors 30 and 31 and bistable flip-flop 32. This rectangular waveform is amplified by amplifier 33 to drive edger one-shot pulse generator 34 to derive the second waveform in FIG. 5 with narrow pulses only about 10 $\mu$ seconds wide for each transition in state between 600 and 1,500 Hz of the first rectangular waveform. Next these pulses are counted by pulse counter 36 until it is reset by the action of end-of-digit detector 37 and reset one-shot 42. This is with end-of-digit detector 37 generating, as shown by the next lower waveform, a continuing pulse with each digit grouping of pulses out of the edger one-shot generator 34 that ends approximately 0.2 seconds after the last pulse of each digit grouping out of edger one-shot pulse generator 34. This is with timing control determined by RC time constant determining circuitry (not shown) with end-of-digit circuit 37. Both the sample one-shot circuit 39 and the reset and advance one-shot circuit 42 generate duplicate narrow pulse waveforms with pulses timed by the end of each digit grouping pulse out of end-of-digit detector 37. Each pulse out of reset and advance one-shot circuit 42 not only resets pulse counter 36 but also advances digit counter 44 to the next highest number. Digit reset one-shot circuit 48 generates a reset output pulse whenever a "1" digit is presented in the input code to reset digit counter 44.

The pulse counter 36 is connected through the four BCD 1, 2, 4 and 8 count lines to pulse counter decoder 45 that provides a lack of dc output signal voltage on just one of ten lines corresponding to the numbers 1, 2, 3, 4. 5, 6, 7, 8, 9 and 0. The number "1" when decoded, serves as a reset signal, resetting digit counter 44 via reset gate 41 and digit counter one-shot circuit 48. It should be noted that the number "1" is never used in an address or channel selection sequence with an address being a unique five-digit code assigned by the serving common carrier. In the illustrated case of FIG. 4 the five-digit code phone number is 23456 with these digit terminals of the pulse counter decoder 45 hard wired to the I, II, III, IV, and V terminals, respectively, of code match gate 47. The number "1" is always transmitted by the ground station transmitted carrier at the beginning and end of an address plus channel selection sequence to reset the pulse counter 36 and digit counter 44.

Decoding of an address is accomplished by sequentially comparing the number of pulses transmitted in each digit to the previously determined "hard wired" code with the comparison done by respective sections of the code match gate 47. Each aircraft radiotelephone transceiver system with its unique address number "hard wired" from the pulse counter decoder 45 into the code match gate 47 must attain correlation sequentially on each of five-digits. If correlation fails to occur on any digit, digit counter 44 is reset to zero, thus preventing the possibility of five successive correct correlations in such instance. Pulse waveforms for the code match gate 47 terminal I, II, III, IV and V inputs are shown in FIG. 5.

When the correct address is received and complete correlation does occur, digit counter decoder 50 pulls an output connection to channel select gate 38 down to a low dc voltage thereby enabling gate 38 and resetting channel counter 53 via channel counter reset 52. Thus, the channel selection gate waveform has the gate enable voltage pull down start with the code match gate V pulse and simultaneously a channel reset pulse as shown in FIG. 5. The channel select sequence portion of the ground station transmitted code then passes directly from the edger one-shot 34 through the channel select AND gate 38, to and through NAND gate 54 and on into the channel counter 53. Channel decoder 56 decodes the output of the channel counter 53 and selectively activates the proper channel crystal circuit via an activated channel crystal select drive circuit of the circuit section 59. Twelve channels are available with two pulses received during the channel select sequence selecting channel 1, three pulses selecting channel 2, etc. With the channel select out waveform shown in FIG. 5 the seven pulses select channel 6. When the channel select sequence is complete end-of-digit detector 37 in conjunction with reset and advance one-shot 48 advances digit counter 44 and digit counter decoder 50 to an output state allowing the output connection to channel select gate 38 and channel counter reset 52 to pull back up to its previous higher dc voltage level. This opens "AND" gate 38 from passage of further pulses reaching the channel counter 53 circuitry. Simultaneously, with this digit counter decoder output connection pull up call timer and call tone circuitry 51 is activated to give an audible and/or visual indication that a call is being received. The final frequency transition in the signaling code is a "1" that resets digit counter 44 via pulse counter decoder 45, reset gate 41 and digit reset one-shot 48. Then the channel crystal select drive circuits section 59 and the remote indicators remain on the channel directed from the ground station until manually overridden by the radiotelephone using operator in the aircraft.

With respect to local channel selection by a user operator aboard the aircraft there is a departure from use of the hard wired system of channel selection employed with ground station code calling. However, the same digital channel counter 53 and channel decoder 56 circuitry used for ground call-up is again utilized for local channel selection. Referring also to the combination block schematic functional diagram of local channel selection circuitry of FIG. 6 a 9 volt dc supply 62 has an output connection providing the 9 volts when handset 19 (of FIG. 1) is off its hook (or when the T switch button is pushed on in the control panel 25 of FIG. 3). The voltage supply 62 output line is connected through switch button illuminating lamps 63A through 63K to, respectively, manual illuminated button switches 64A through 64K. The 1 through 12 channel outputs of remote channel decoder 58 are connected, respectively, through resistors 65A through 65K to the bases of NPN transistors 66A through 66K. Transistors 66A through 66K have emitters connected to ground and collectors connected both through resistors 67A through 67K to the dc voltage output line from dc supply 62 and also to the bases of NPN transistors 68A through 68K. The emitters of transistors 68A through 68K are connected to ground while the collectors are connected to the junction of lamps 63A through 63K with switches 64A through 64K that are normally open switches. The other side of switches 64A through 64K are connected in common to channel select oscillator flip-flop circuit 69 having an output connection through pulse amplifier 70 as an input to NAND gate 54. The output of NAND gate 54 is connected to the signal invert terminal 55 of channel counter 53 having four line BCD output connections to the buffer amplifier 57 and channel decoder 56, shown in this instance as including crystal drive circuits that are in circuit section 59 of FIG. 4. Buffer amplifiers 57 are connected by four parallel lines to remote channel decoder 58.

Closure of a single manually operated button switch 64A through 64K to the closed conductive contact point energizes the local channel select oscillator flip-flop 69 that generates a rectangular pulse train at approximately 10KHz. The dc power supplied passes from dc supply 62 through the lamp 63A through 63K connected to the one closed conducting switch 64A through 64K and on to operate the oscillator flip-flop 69 without turn on of the lamp since there is not sufficient voltage potential drop through the lamp at this stage of operation. The 10KHz pulse train from channel select oscillator flip-flop circuit 69 is amplified by pulse amplifier 70 and passed through NAND gate 54 to the input of channel counter 53. When channel counter 53 and the decoders 56 and 58 have counted to the correct channel corresponding to the single switch depressed the corresponding output terminal of remote channel decoder 58 drops to a low dc voltage unsaturating its respective drive transistor 66A through 66K to thereby allow its respective lamp 63A through 63K drive transistor 68A through 68K to saturate. Saturation of the particular transistor 68A through 68K to the collector emitter through conductive state causes the channel lamp 63A through 63K (corresponding to the channel switch depressed) to light. It also simultaneously removes the dc voltage from the channel select oscillator flip-flop circuit 69 and immediately stops the oscillator 69 from continued oscillation. Thus, the channel counter 53 and the decoders 56 and 58 immediately stop their count and the channel crystal drive circuits lock the airborne radiotelephone transceiver to the selected channel.

Whereas this invention is herein illustrated and described with respect to a specific embodiment hereof, it should be realized that various changes may be made without departing from essential contributions to the art made by the teachings hereof.

We claim:

1. In a radiotelephone system for two-way public communication between mobile radiotelephones and call stations interconnectable with telephone telecommunication networks and having a common selective calling and channel code transmit frequency that all mobile radiotelephones of the system are tuned to, and a plurality of two frequency receiver/transmitter talking channels: a mobile radiotelephone having a receiver circuit and a transmitter circuit and responsive to a predetermined selective calling and channel code format; selective calling code specific mobile radiotelephone identifying and responsive decoder and indication activation system means; channel selection means connected to said decoder and indication activation system means via channel select gate means also connected to pass channel code signals when gate activated by said decoder and indication activation system means; channel counter means connected to an output of said gate means and having a plurality of outputs; of a channel decoder connected to said plurality of outputs of said channel counter and having a plurality of individual channel frequency drive output circuits connected to modulate said receiver circuit and said transmitter circuit; microphone means connected to said transmitter and speaker means connected to said receiver for conducting two-way telephone calls from said mobile radiotelephone with said call stations on a selective call basis; wherein said predetermined selective calling and channel code format utilizes pulses generated from tone transitions between at least two preselected frequencies modulated on said common selective calling and channel code transmit frequency with pulse generating means; pulse counter means connected to said pulse generating means and having a four wire 1, 2, 4 and 8 count BCD output; pulse counter decoder means connected to the four wire 1, 2, 4 and 8 count BCD output of said pulse counter means, having a pulse count "1" output line connected to reset gate means, and having a plurality of digit output terminals; a code match gate having a plurality of input terminals hard wired in predetermined order to a predetermined number of said plurality of digit output terminals as the specific call number for the radiotelephone; and a digit counter decoder circuit having a plurality of input connections from said code match gate and an output connection as the decoder and indication activation system means connection to said gate.

2. The radiotelephone of claim 1, wherein end-of-digit detector means is connected to said pulse generating means and output connected through circuit means to said reset gate means; and with said reset gate means output connected to said code match gate and through a digit counter circuit having circuit input connection from said end-of-digit detector means and a plurality of output connections to said digit counter decoder circuit for system reset for repeated station calling sequences to that specific radiotelephone.

3. The radiotelephone of claim 2, wherein said mobile radiotelephones are airborne radiotelephones and said call stations are ground stations connected by common carrier links to telephone telecommunication networks; and having a remote channel decoder connected to said plurality of outputs of said channel counter, and having a plurality of individual channel indicator outputs connected to remote indicator driver circuits.

4. The airborne radiotelephone of claim 3, wherein the plurality of individual channel indicator outputs of said remote channel decoder are also connected to local select circuitry; a local channel select oscillator connected to said local select circuitry and having an output connection through NAND gate means output connected in a local channel select control loop to said channel counter; and with said channel select gate means output connected to said NAND gate and through said NAND gate to said channel counter means.

5. In a radiotelephone system for two-way public communication between mobile radiotelephones and call stations interconnectable with telephone telecommunication networks and having a common selective calling and channel code transmit frequency that all mobile radiotelephones of the system are tuned to, and a plurality of two frequency receiver/transmitter talking channels: a mobile radiotelephone having a receiver circuit and a transmitter circuit and responsive to a predetermined selective calling and channel code format; selective calling code specific mobile radiotelephone identifying and responsive decoder and indication activation system means; channel selection means connected to said decoder and indication activation system means via channel select gate means also connected to pass channel code signals when gate activated by said decoder and indication activation system means; channel counter means connected to an output of said gate means and having a plurality of outputs; a channel decoder connected to said plurality of outputs of said channel counter and having a plurality of individual channel frequency drive output circuits connected to modulate said receiver circuit and said transmitter circuit; microphone means connected to said transmitter and speaker means connected to said receiver for conducting two-way telephone calls from said mobile radiotelephone with said call stations on a selective call basis; wherein a local pulse generator is provided in a local channel select oscillator control loop utilizing said channel counter; with said channel decoder and said individual channel frequency drive circuits pulse counted to the channel selected; local channel select oscillator turn on means; and local channel select oscillator turn off means for turn off of the local channel select oscillator pulse generated count when the chosen channel crystal select drive circuit is activated; and wherein two channel decoders are provided both connected to said plurality of outputs of said channel counter; with a first channel decoder being said channel decoder having a plurality of individual channel frequency drive output circuits; a second channel decoder having a plurality of individual channel indicator outputs; and with local select circuitry connected to voltage supply means, to said local pulse generator, and through individual manual control means to respective individual channel indicator outputs of said second channel decoder for controlled pulse generation start and stop of said local pulse generator.

6. The radiotelephone of claim 5, wherein said individual manual control means are a plurality of manually activated switches, one for each channel of operation; a plurality of impedance devices connected from said voltage supply in series with each switch to said local pulse generator; and a plurality of bias varying circuits individually connected respectively to said plurality of individual channel indicator outputs as the actuating input to said bias varying circuits to individually vary the bias applied to the junction of respective said impedance devices and said switches and through the selected manually actuated switch to said local pulse generator.

7. The radiotelephone of claim 6, wherein said plurality of impedance devices are a plurality of lamps; with said lamps normally off and subject to insufficient voltage drop when the switch of a lamp is actuated to remain off for an interval with the local pulse generator pulse counting the control loop to actuation of the output connected to the switch actuated of the said plurality of individual channel indicator outputs; and simultaneous turn on of the activated switch lamp and turn off of the local pulse generator with bias change of the bias varying circuit connected to the activated switch with activation of the output connected to the bias varying circuit connected to the activated switch.

8. The radiotelephone of claim 6, wherein said local pulse generator is an oscillator circuit generating pulses at a much higher pulse frequency rate than the pulse frequency rate generated with a predetermined selective calling and channel code format transmitted from said call stations.

* * * * *